United States Patent
Dahlgren et al.

(10) Patent No.: US 12,063,460 B2
(45) Date of Patent: Aug. 13, 2024

(54) METHOD AND DEVICE FOR SUPPRESSING CHROMATIC ABERRATION IN A DIGITAL IMAGE

(71) Applicant: Axis AB, Lund (SE)

(72) Inventors: Gunnar Dahlgren, Lund (SE); Johan Jeppsson Karlin, Lund (SE)

(73) Assignee: AXIS AB, Lund (SE)

( * ) Notice: Subject to any disclaimer, the term of this patent is extended or adjusted under 35 U.S.C. 154(b) by 73 days.

(21) Appl. No.: 17/943,263

(22) Filed: Sep. 13, 2022

(65) Prior Publication Data

US 2023/0143980 A1 May 11, 2023

(30) Foreign Application Priority Data

Nov. 11, 2021 (EP) ..................................... 21207671

(51) Int. Cl.
*H04N 9/64* (2023.01)
*H04N 9/73* (2023.01)

(52) U.S. Cl.
CPC .............. *H04N 9/646* (2013.01); *H04N 9/73* (2013.01)

(58) Field of Classification Search
CPC ........ H04N 9/646; H04N 9/73; H04N 25/611; H04N 1/58; H04N 25/61; G06T 7/90
See application file for complete search history.

(56) References Cited

U.S. PATENT DOCUMENTS

| 7,474,337 | B1 | 1/2009 | Cooper |
| 8,582,878 | B1 | 11/2013 | Tzur et al. |
| 2009/0189997 | A1 | 7/2009 | Stec et al. |
| 2021/0342981 | A1* | 11/2021 | Lin .......................... G06T 5/80 |

FOREIGN PATENT DOCUMENTS

JP 2003-018407 A 1/2003

OTHER PUBLICATIONS

Joonyoung Chang, Correction of axial and lateral chromatic aberration with false color filtering, Mar. 2013, IEEE Transactions On Image Processing, vol. 22, No. 3. pp. 1186-1198.*
Extended European Search Report dated Mar. 24, 2022 for European Patent Application No. 21207671.5.

* cited by examiner

*Primary Examiner* — Christopher K Peterson
(74) *Attorney, Agent, or Firm* — Volpe Koenig

(57) ABSTRACT

A method for suppressing chromatic aberration, especially blue or red fringing, in a digital image with multiple color channels is disclosed. The method comprises negatively correcting a first color channel by subtracting an overshoot component of the first color channel. The subtraction is subject to a lower threshold, which is dependent on a local value of at least one further color channel.

14 Claims, 5 Drawing Sheets

METHOD AND DEVICE FOR SUPPRESSING CHROMATIC ABERRATION IN A DIGITAL IMAGE

FIELD OF INVENTION

The present disclosure relates to the field of digital image processing and in particular to methods and devices for suppressing chromatic aberration.

TECHNICAL BACKGROUND

Images captured by a camera via an imaging system, such as a lens system, will inevitably include distortions. There are different kinds of distortions, and their magnitude will depend on several factors, relating to the imaging system as well as features of the imaged scene, or a combination of the two. Chromatic aberration may be attributed to the fact that light of different wavelengths will refract differently when passing a refractive medium, more particularly a lens of an imaging system. There are two main types of chromatic aberration: axial (or longitudinal) chromatic aberration and lateral (or transverse) chromatic aberration.

Axial chromatic aberration corresponds to an axial spread of the focal points of respective wavelength components in light that impinges on a lens parallel to its optical axis. As a rule, the focal points for shorter wavelengths will be closer to the lens than those for relatively longer wavelengths. To illustrate, FIG. 1 shows a lens 102 with optical axis 108 and an image plane 104 of a green wavelength component 112. It is seen that the focal distance of a blue component 106 is shorter, and the focal distance of the red component no is longer. As a result, the respective sharpness of the red, green, and blue components will not be uniform between themselves. In the design of complex optical equipment, with multiple refractive elements, is not uncommon for the selection and spacing of these elements to be optimized for the green component 112, which is at the approximate center of the visible spectrum. Artefacts related to axial chromatic aberration include colored areas in the image, since not all three colors (red, green, blue) may be imaged in focus at the same time, thereby giving edges in the image a smeared appearance.

In lateral chromatic aberration, the different wavelength components are focused on a common image plane but exhibit a lateral spread relative to the optical axis. Lateral chromatic aberration is generally more pronounced for light rays impinging obliquely on the lens. As such, it does not occur at the center of the image plane. FIG. 2 illustrates some effects of lateral chromatic aberration. The same reference numbers are used as in FIG. 1, save that the image plane 104 is now common to all wavelengths. It is seen that differently colored light rays emanating from one point in a scene will be refracted in such manner that the focal points of the different wavelengths are laterally shifted in the image plane 104.

Axial and lateral chromatic aberration affect different optical systems to different degrees. Both types can be significantly reduced by the use of high-grade achromatic optics, which however may be too costly for many important applications. In relatively simpler optical systems where the use of achromatic optics is not justified, users may need to accept that the system provides imperfect raw images but can apply subsequent image processing to lessen the imperfections or make them less disturbing.

The present disclosure addresses a type of chromatic aberration which is oftentimes referred to as blue fringing. A visible sign of blue fringing is that a blue, purple, or magenta halo is formed around an imaged object, this halo being particularly conspicuous at edges where a dark area meets a bright area in the image, e.g., around a backlit object or an object of high contrast. The above-described optical phenomenon that creates blue or bluish fringes can also produce red or reddish fringes. A given imaging system may be affected chiefly by blue fringing or, which is less common, chiefly by red fringing. In imaging systems where blue and red fringing are equally important, the chromatic aberration may be referred to as purple fringing.

While the blue fringing artefact has been studied for a long time and is generally well understood, the available image processing techniques intended to suppress or remove the blue fringes still leave to be desired. Indeed, some techniques aiming to compensate the blue fringes tend to do so at the price of introducing new artefacts into the image. The new artefacts may, at worst, be amplified by subsequent processing steps, such as dynamic-range compression (DRC), tone mapping, and sharpening, that render the artefacts more disturbing for a human viewer. DRC for instance tends to brighten the darker areas, where the blue fringes are normally located, which makes them more visible to a viewer.

SUMMARY

The present disclosure sets forth methods and devices available which are suitable for suppressing chromatic aberration in a digital image without introducing new visual artefacts. The disclosure also makes available such methods and devices that are less likely to introduce patterns susceptible of being transformed into visual artefacts by downstream image processing steps. Improving the suppression of blue fringes in the digital image is highly desirable. It is furthermore desirable to make available such suppression that operates locally, i.e., without a need to compute global quantities that characterize the full digital image. Still further, what is proposed is such methods and devices that are suitable for use with digital video cameras for monitoring applications.

At least some of these are achieved by the present disclosure as defined in the independent claims. The dependent claims relate to advantageous embodiments of the disclosure.

In a first aspect of the present disclosure, there is provided a method suitable for suppressing chromatic aberration in a digital image with multiple color channels. The method comprises a step of negatively correcting a first color channel by subtracting an overshoot component of the first color channel. This subtraction operation, rather than subtracting the overshoot component without restriction, is subject to a lower threshold. The lower threshold is dependent on a local value of at least one further color channel.

The first color channel may correspond to such wavelengths for which the imaging system does not perform optimally, and which is therefore relatively more exposed to imaging imperfections. For example, as explained in more detail above, a focal point of the first color channel may deviate axially or laterally from the focal point of wavelengths that are located relative more centrally in the imaging system's design spectrum. Depending on the color system used, the first color channel may be a blue or bluish hue (to address blue fringing) or a red or reddish hue (to address red fringing). The inventors have realized that the compensation performed on the first color channel is to be balanced against one or more of the further color channels of the digital image. This avoids overcompensation and thus the formation of excessive anti-fringes; with respect to blue fringes, the anti-fringes are yellowish. One way to achieve such balancing is to form a lower threshold from the further color channels and to make the subtraction operation conditional upon the lower threshold, in the sense that that the resulting value of the first color channel shall not be less than the lower threshold.

In some embodiments, the lower threshold is a local value of a second color channel. The second color channel may correspond to a central wavelength of the imaging system's design spectrum, e.g., green or greenish.

In other embodiments, the lower threshold is a combination of local values of a second and third (and any further) color channel. The combination may be an arithmetic mean, a geometric mean, or a harmonic mean, wherein each of these means may have a uniform or nonuniform weighting of the color channels involved. This may help ensure that the negative correction of the first color channel produces a visually acceptable result even when a second and third color channel differ considerably between themselves.

In some embodiments, the lower threshold value has a granularity of one pixel, whereby the "local value" is a pixel value. In other embodiments, the lower threshold value has a granularity of a group of multiple pixels, such as square-shaped groups of 4, 9, 16, 25 etc. pixels, diamond-shaped or differently shaped groups. This reduces the computational effort of forming the lower threshold. For example, the lower threshold for one pixel group may be set to the value of a centrally located pixel, or it may be set to a mean or median of the pixel values in the pixel group.

In some embodiments, the lower threshold is enforced uniformly throughout the digital image. This is to say, although the lower threshold is still based on local values of the further color channel(s) and thus may vary over the digital image, the subtraction of the overshoot component is everywhere conditional upon the lower threshold, whatever its value may be. Alternatively, the lower threshold is enforced only in subareas of the digital image, and the full overshoot component is subtracted without restriction elsewhere. The total computational effort in such embodiments may be lower.

In some embodiments, the overshoot component is computed as a difference between the first color channel of the digital image and a low-pass filtered copy of the same color channel. The difference may be a pixel-wise difference or a difference with a higher granularity, e.g., using one of the pixel groupings outlined above. The difference may further undergo one or more of ramping (i.e., its positive or negative part may be retained), linear and nonlinear scaling. For the avoidance of doubt, the term "overshoot component" in the present disclosure designates a static quantity of a digital image or digital video frame; it has no immediate connection with the eponymous transients in some higher-order dynamical systems.

It is understood that the negative correction can be applied to more than one color channel. For instance, according to some embodiments, the impact of purple fringing can be reduced by applying negative correction to both a blue and a red color channel of the same digital image.

It is furthermore understood that the negative correction of the first color channel can be performed alongside a positive correction. The positive correction may be applied to the first color channel or to a different one of the color channels of the digital image. The positive correction may include adding an undershoot component of the same color channel subject. Optionally, the addition of the undershoot component may be conditional upon an upper threshold, which is dependent on a local value of at least one color channel which is different from the color channel to which the positive correction is applied.

In some embodiments, the negative correction (and any positive correction) is executed prior to any dynamic-range compression, tone mapping or sharpening of the digital image. This sequencing is preferable as the dynamic-range compression, tone mapping and sharpening may otherwise tend to amplify the uncompensated artefacts related to chromatic aberration.

In a second aspect of the present disclosure, there is provided an image processing device configured to suppress chromatic aberration in a digital image with multiple color channels. The image processing device comprises a memory and processing circuitry configured to perform the method according to the first aspect. The image processing device may be an embedded component of a digital video camera, especially a video camera for monitoring-related use cases.

The second aspect shares the effects and advantages of the first aspect and can be implemented with a corresponding degree of technical variation.

The disclosure further relates to a computer program containing instructions for causing a computer, or the image processing device in particular, to carry out the above method. The computer program may be stored or distributed on a data carrier. As used herein, a "data carrier" may be a transitory data carrier, such as modulated electromagnetic or optical waves, or a non-transitory data carrier. Non-transitory data carriers include volatile and non-volatile memories, such as permanent and non-permanent storage media of magnetic, optical, or solid-state type. Still within the scope of "data carrier", such memories may be fixedly mounted or portable.

In the present disclosure, "blue fringes", "blue fringing" and similar terms referring to a particular color shall be construed broadly, namely, with an understanding that red fringes, magenta fringes etc. arise from a common refraction-related phenomenon. It is furthermore appreciated that differently colored artefacts can oftentimes be remedied by analogous techniques.

Generally, all terms used in the claims are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order described, unless explicitly stated.

BRIEF DESCRIPTION OF THE DRAWINGS

Aspects and embodiments are now described, by way of example, with reference to the accompanying drawings, on which.

DETAILED DESCRIPTION

The aspects of the present disclosure will now be described more fully hereinafter with reference to the accompanying drawings, in which certain embodiments of the disclosure are shown. These aspects may, however, be embodied in many different forms and should not be construed as limiting; rather, these embodiments are provided by way of example so that this disclosure will be thorough and complete, and to fully convey the scope of all aspects of the disclosure to those skilled in the art. Like numbers refer to like elements throughout the description.

Figure 1:
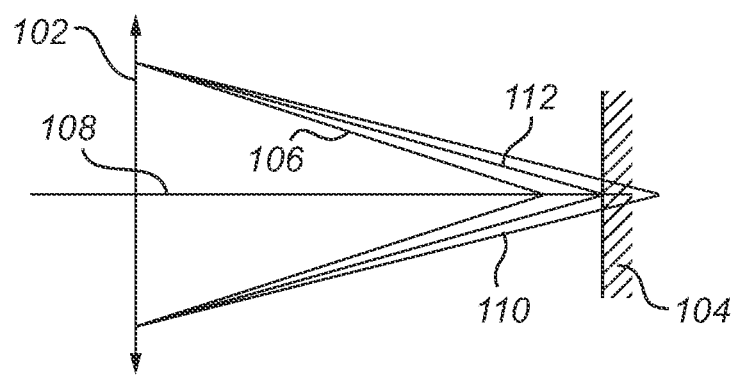
FIG. 1 is a schematic view illustrating effects of axial chromatic aberration.
Figure 2:
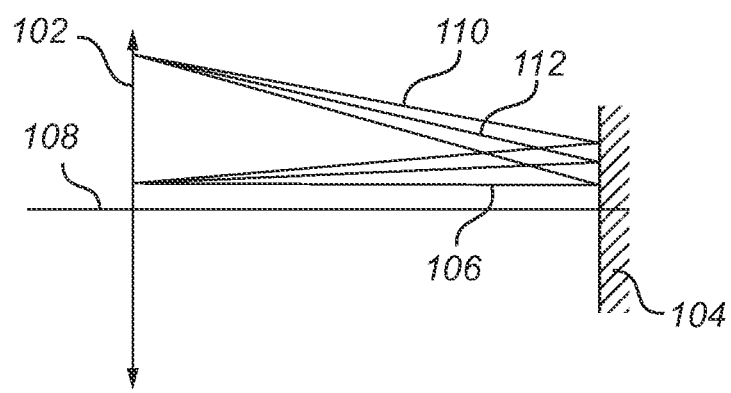
FIG. 2 is a schematic view illustrating effects of lateral chromatic aberration.

FIGS. 1 and 2, which aim to elucidate some aspects of chromatic aberration, have been described above.

Figure 4:
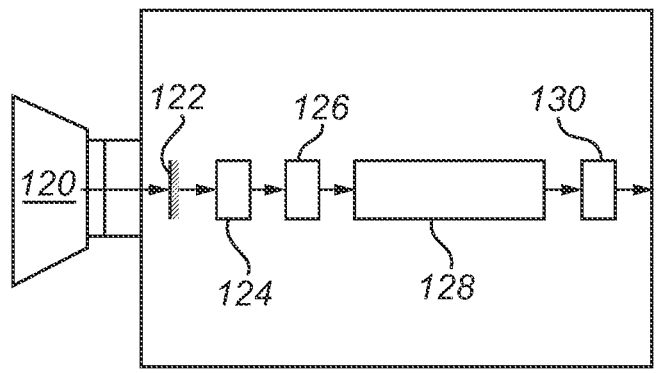
FIG. 4 is a block diagram of an imaging system.

FIG. 4 is a schematic view of an imaging system, in this case a digital video camera. The imaging system has a lens system 120 imaging a scene on an image sensor 122. The image sensor 122 is provided with a color filter array, e.g., a Bayer filter, such that different pixels will receive radiation of a particular wavelength region, in accordance with a known, usually mosaic-like pattern. After having read the signal of individual sensor pixels of the image sensor 122, demosaicing is carried out 124. At this point, the color information in the scene has been extracted, i.e., the detected signal from the scene has been separated into the components of the color system for which the color filter array is designed. The color channels may be wavelengths constituting primary colors, which can be combined into desired points in a subset (gamut) of the visible color space. The color channels may for example correspond to specified red R, green G, and blue B colors. To correct inadequacies in the color reproduction, a color correction matrix is applied 126 on the demosaiced sensor output. The color correction matrix could be described as a calibration matrix which, for each pixel of the image sensor 122, takes a wavelength-dependent response into account. In a straightforward process, the color correction matrix is deduced by imaging a known target with the imaging system, the target typically being a color rendition chart. Consequently, there is a target of known color properties, a resulting image sensor response, and a color correction matrix that when applied should bring the sensor response closer to the known target, effectively resulting in an optimization task that tends to produce an optimal color correction matrix. An error in color may be described in different ways, and there are many algorithms for deducing a minimum total error. The present disclosure does not advocate any specific color error measure or optimization algorithm. When applying the color correction matrix 126, the response from the image sensor (following demosaicing 124) is transformed to, or at least closer to, the value it should have according to the color rendition chart. In state-of-the-art imaging systems, the actual step of performing imaging of the color rendition chart may be left out, and by using spectral response data for the particular sensor and imaging system, a color correction matrix may be deduced.

Following application of the color correction matrix 126, the response from the image sensor, pixel by pixel, should have been corrected to a true, or at least more accurate, color representation in which a total color error is minimized. The resulting image is forwarded to an image processing pipeline 128. It should be noted that the application of the color correction matrix 126 could be seen as an integral part of the image processing pipeline 128. The image processing pipeline 128 may include noise filtering (for eliminating spatial and/or temporal noise), distortion correction (for eliminating effects of, e.g., barrel distortion), global and/or local tone mapping (e.g., enabling imaging of scenes containing a wide range of intensities), transformation (e.g., rotation), flat-field correction (e.g., for removal of the effects of vignetting), application of overlays (e.g., privacy masks, explanatory text), dynamic-range correction (including dynamic range compression), sharpening etc. These example operations may be arranged in the order the implementer sees fit. The image processing pipeline 128 may also be associated with an analytics engine performing object detection, object recognition, alarm triggering, etc. Following the image processing pipeline 128, the digital image may be forwarded to an encoder 130, which is responsible for coding the image data according to an encoding protocol and forward to a recipient, a server, a cloud storage, etc. in a desired image format.

Figure 3:
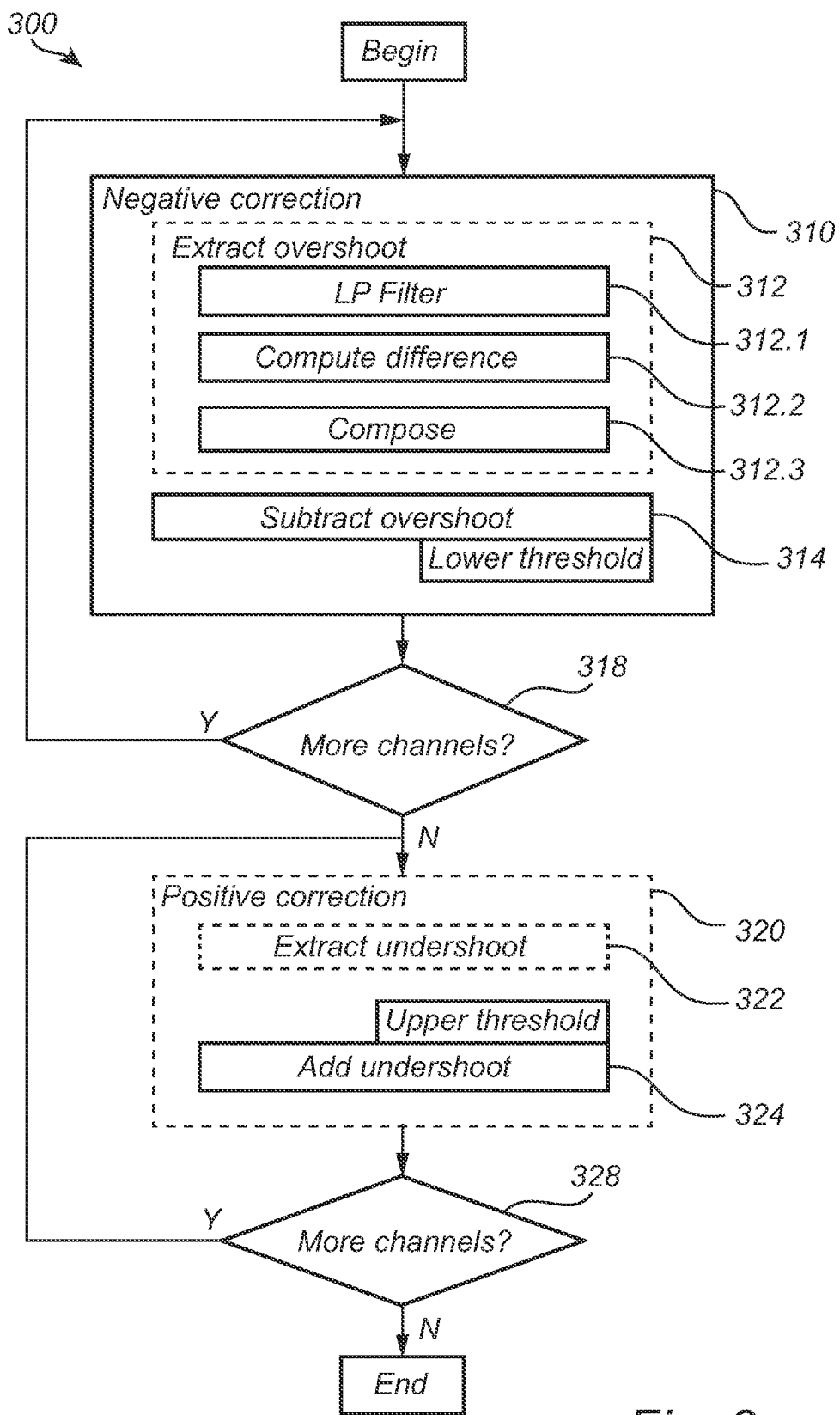
FIG. 3 is a flowchart of a method for suppressing chromatic aberration in a digital image, according to embodiments of the present disclosure.

FIG. 3 is a flowchart of a method 300 for suppressing chromatic aberration in a digital image, according to embodiments of the present disclosure. The method 300 may be implemented in an image processing device 510 of the type illustrated in FIGS. 5-7. In relation to the successive stages of the imaging system of FIG. 4, it is advantageous to perform the method 300 prior to the image processing pipeline 128. Preferably, the method 300 is performed after the color correction matrix 126 has been applied. Alternatively, the method 300 may be integrated into the image processing pipeline 128, where it is preferably performed after any noise filtering and prior to any dynamic-range compression, tone mapping or sharpening operation therein. In dual-exposure and similar systems, where two exposures of the same scene are merged, it is preferable to perform the method 300 after the exposure merging, i.e., on the merged image.

On an overall level, the method 300 is structured into a negative correction block 310 and an optional positive correction block 320. Each of the blocks 310, 320 can be applied to one color channel of the digital image or to multiple color channels. The positive correction 320, if any, can be applied to a different color channel than that or those which undergo negative correction 310. Preferably, the corrections 310, 320 are applied to color channels representing non-central wavelengths in the imaging system's design spectrum, such as blue (bluish) or red (reddish) color channels. The order of the blocks 310, 320 may be as shown in FIG. 3 or inverted. Also possible are staggered sequences, where one or more negative corrections alternate with one or more positive corrections. For example, a negative correction of a first color channel may be followed by a positive correction of the first component, which is followed, in turn, by a negative correction of a second color channel, with optional further positive and/or negative corrections.

When the negative correction 310 is applied to a first color channel of the digital image, it includes a step of extracting 312 an overshoot component from image data relating to the first color channel of the digital image. Since blue fringing is known to exaggerate sharp edges, the overshoot component may be chosen to represent a high-frequency component of the first color channel, where frequency refers to the spatial variation of the image data. One way of obtaining such a high-frequency component is to first compute a low-pass (LP) filtered copy of the first color channel and then subtract the LP-filtered copy from the original first color channel.

It is assumed that the digital image is provided in the form of a spatial representation with three color channels {B(u, v), R(u, v), G(u, v)}, each of which expresses the corresponding values (e.g., intensity, luminance) as functions of an index pair (u, v) which designates a pixel. (As announced above, a coarser granularity can be used, wherein the index pair (u, v) designates a predefined group of pixels.) The value functions may be represented as tables, in particular lookup tables, where the entries may be 8-bit (4+4) floating-point numbers. The three color channels are expressed in common or comparable units. Preferably, the three color channels are in common linear units, whereby cross-channel processing is simplified, e.g., linear scaling of a value triplet essentially preserves the hue. The color channels may have an original or near-original dynamic range, or they may have a pre-compressed dynamic range. Because the method 300 does not rely on the occurrence of pixel saturation to detect image areas potentially affected by aberration, the method 300 can be applied also to high dynamic range (HDR) images. The method 300 may in fact perform better when applied to HDR images, since local values of the further color channel(s), from which the lower threshold depends, have not been altered by saturation.

A spatial representation of one of these types would be a straightforward format in which to exchange an image among components of a digital imaging system. If the method 300 is utilized for postprocessing outside the imaging system which acquired the digital image, the digital image may be provided in a compressed format suitable for storage or data transfer. In this case, it may be necessary to decompress (or unpack) the image data into a spatial representation where all color channels are in common or comparable units. A similar procedure may be a useful preparation to the method 300 if the digital image is a frame of a prediction-coded video sequence, optionally with recourse to earlier or later frames of the sequence. It is noted furthermore that the method 300 cannot readily be applied to image data in YCbCr format, where neither of the luma Y and chroma Cb, Cr components has a direct relationship with a color. A preliminary conversion into a representation in terms of color channels, such as RGB, is therefore necessary.

Returning to step 312, the literature discloses several suitable algorithms for providing 312.1 a LP-filtered copy of a channel of a digital image encoded according to one of the above types. Examples include the Fourier transform. One option is to Fourier transform (e.g., using a fast Fourier transform (FFT) or direct Fourier transform (DFT)) the spatial representation of a color channel $$\{B(u,v): u=1,2,\ldots,U, v=1,2,\ldots V\},$$

where U×V is the resolution of the digital image, into a frequency representation:

$$\{\hat{B}(k): k=(k_u,k_v), \text{ where } k_u=1,2,\ldots, k_v=1,2,\ldots\},$$

such that $\hat{B}(k)=0$ for $|k|>K_{max}$, and then inversely transforming this into a spatial representation including only frequency content below $K_{max}$:

$$\{B^{LP}(u,v): u=1,2,\ldots,U, v=1,2,\ldots V\}.$$

To ensure that $\hat{B}(k)=0$ for $|k|>K_{max}$, one may either design the Fourier-type transformation so that it forgoes the computation of the higher frequency components, or one may eliminate those frequency components subsequently, before the inverse transformation. The upper bound $K_{max}$ may be determined empirically by executing the method 300 for a tentative $K_{max}$ value on images of similar scenes and/or with comparable brightness and coloring, and make adjustment until a visually pleasing result is achieved. Alternatively, one may utilize a non-perceptual evaluation and instead compare the frequency response and/or sharpness of the compensated first color channel with the same quantity of a color channel corresponding to a centrally located wavelength, such as green or greenish.

Another option is to compute 312.1 the low-pass filtered copy by convolving the spatial representation B (u, v) with a kernel κ:

$$B^{LP}(u,v)=(B*\kappa)(u,v)=\iint B(u',v')\kappa(u',v';u,v)du'dv'$$

The convolution may correspond to uniform blurring, e.g., Gaussian blurring, in which case the kernel is symmetric with respect to the origin:

$$\kappa(u',v';u,v)=\kappa(|u'-u|,|v'-v|)$$

Alternatively, or additionally, the kernel κ may be designed to compensate a pointspread function (PSF) of optics in the imaging system by which the digital image was acquired. If the PSF is different for on-axis and off-axis image points, the kernel may not have the above symmetry property; rather, the kernel depends on u, v. It is noted that the convolution operation can be designed to absorb one or more further steps of the method 300, including the different computation 312.2 to be described next, for a suitably chosen kernel κ.

In implementations, to reduce the requirement for runtime (e.g., on-chip) memory, a kernel κ which is supported on a large interval can be conveniently split into a sum multiple sub-kernels $\kappa=\kappa_1+\kappa_2+\ldots$, where each sub-kernel is supported on a relatively smaller interval. Optionally, the implementer may define variable offsets for the sub-kernels, wherein the offsets (rather than the sub-kernels themselves) can be made dependent on the distance from the optical axis.

Next follows a step of computing 312.2 a difference of the color channel and the LP-filtered copy:

$$B(u,v)-B^{LP}(u,v).$$

This difference can optionally be processed further before it is used in the subsequent steps, e.g., by composing 312.3 the difference function with at least one other function g, so that the overshoot component is obtained as:

$$g(B(u,v)-B^{LP}(u,v)).$$

Preferably, the function g is non-decreasing almost everywhere or increasing almost everywhere. In a computer implementation of the method 300, the function g can be represented as a piecewise linear (PWL) function, for which efficient software code is publicly available.

A first option is to use a ramp function, such as a positive-part or negative-part function as g, respectively defined as:

$$x_+ = \begin{cases} x, & \text{if } x > 0, \\ 0, & \text{else,} \end{cases}$$

$$x_- = \begin{cases} -x, & \text{if } x < 0, \\ 0, & \text{else,} \end{cases}$$

or locally smoothed versions of these.

A second option is to use a constant scaling factor $g(x)=\alpha_1 x$, where the coefficient $\alpha_1$ can be used to adjust the magnitude of the negative compensation 310. Preferably, the coefficient $\alpha_1$ is constant for the first color channel throughout the digital image. A corresponding coefficient $\alpha_2$ for a second color channel can be independent of the first coefficient $\alpha_1$. Similar to the constant $K_{max}$ discussed above, the coefficient $\alpha_1$ may be determined empirically by trying different tentative values and choosing the visually most pleasing one. A non-perceptual evaluation is possible as well, wherein frequency responses and/or sharpness indicator values of the compensated first color channel and a reference color channel corresponding to a centrally located wavelength are compared.

A third option is to use a nonlinear scaling function. For example, one may use a non-decreasing scaling function with superlinear asymptotics at zero, such as $$g(x) = \begin{cases} x|x|^{p-1}, & |x| \leq 1, \\ x, & \text{else,} \end{cases}$$

which for p>1 goes to zero faster than any multiple of x when $|x| \to 0$. If the difference $B(u, v) - B^{LP}(u, v)$ is composed with a scaling function with superlinear asymptotics, the negative compensation 310 will be applied to pixels (or pixel groups) where the difference is significant but not elsewhere. Indeed, those image areas where blue fringing is negligible can be left intact, so as not to run the risk of introducing artefacts unnecessarily. The scaling function may be replaced by a dilated version $$g_a(x) = g\left(\frac{x}{a}\right), a > 0,$$

if the scaling needs to be adapted to the perception of 'significant' differences and 'negligible' fringing in the use case at hand.

In different embodiments, the first, second and third options can be advantageously combined by composing the corresponding functions into said g.

Next, there follows a step of subtracting 314 the overshoot component from the first color channel. According to the method 300, the subtraction is not unrestricted but is subject to (or conditional upon) a lower threshold $T_B(u, v)$, which is dependent on a local value of at least one further color channel:

$$B(u,v) \mapsto \max\{B(u,v) - g(B(u,v) - B^{LP}(u,v)), T_B(u,v)\}, \quad (1)$$

where g is the function introduced in the optional step 312.3. In embodiments where the method 300 does not include the optional step 312.3, one may conceptually set g(x)=x in equation (1). The maximum operation ensures that the pixel value B(u, v) will be replaced by a value which is equal to at least the threshold $T_B(u, v)$.

In some embodiments of the method 300, the threshold can be set equal to the local value of another color channel, e.g., $T_B(u, v)=G(u, v)$ or $T_B(u, v)=R(u, v)$. In other embodiments, the threshold is a combination of the local values of two other color channels:

$$T_B(u,v) = \beta_1 G(u,v) + \beta_2 R(u,v), \beta_1, \beta_2 > 0.$$

The combination may be a plain mean value ($\beta_1=\beta_2=\frac{1}{2}$) or a weighted average ($\beta_1+\beta_2=1$). A further option is to use $\beta_1+\beta_2=\frac{2}{3}$, which in some conditions (when G(u, v) and R(u, v) are approximately equal) will cause the three color channels to have approximately equal intensity, whereby the compensated pixel will have an unobtrusive greyish hue. The combination may as well be a maximum or a minimum of the two other color channels:

$$T_B(u,v) = \max\{G(u,v), R(u,v)\},$$

$$T_B(u,v) = \min\{G(u,v), R(u,v)\}.$$

As explained above, the method 300 may be performed with different granularities, that is, the index pair (u, v) may refer to a pixel or to a group of multiple pixels. Specifically, a rule may be applied by which the subtraction step 314 assigns the threshold value to all pixels in a pixel group as soon as any pixel in the group would end up below the threshold value if the overshoot component was subtracted.

A further option is to perform the subtraction step 314 with a one-pixel granularity but compute the threshold $T_B$ with a coarser granularity. One way to achieve this is to partition the pixel space [1, U]×[1, V] into pixel groups $\{W_i \subset \mathbb{Z}^2 : i \in I\}$, where I is an index set, such that:

$$\bigcup_{i \in I} W_i = [1, U] \times [1, V]$$

and $W_i \cap W_j = \emptyset$ for any $i \neq j$. Starting from a threshold with pixel-group granularity, $T_B = T_B(W_i)$, the subtraction operation 314 may still be formulated with one-pixel granularity, though with a modified threshold $\tilde{T}_B$:

$$B(u,v) \mapsto \max\{B(u,v) - g(B(u,v) - B^{LP}(u,v)), \tilde{T}_B(u,v)\}, \quad (2)$$

where $\tilde{T}_B(u, v)$ is piecewise constant, i.e., $\tilde{T}_B(u, v) = T_B(W_i)$ for i such that $(u, v) \in W_i$. Alternatively, the modified threshold $\tilde{T}_B(u, V)$ in (2) may be replaced by an interpolation of $\tilde{T}_B(u, V)$. For example, if each $W_i$ is a group of 9×9 pixels, then the interpolation may have a finer granularity of 5×5 pixels. A threshold function with pixel-group granularity may be defined as $T_B(W_i) = R(u_i, v_i)$, where $(u_i, v_i)$ is a central pixel in $W_i$. Alternatively, an average of the local values may be formed:

$$T_B(W_i) = \frac{1}{|W_i|} \sum_{(u,v) \in W_i} R(u, v),$$

where $|W_i|$ is the number of pixels in $W_i$.

Along the same lines, moreover, it is possible to modify the method 300 such that the threshold $T_B$ has one-pixel granularity but the subtraction 314 is performed with a coarser granularity.

Figure 8:
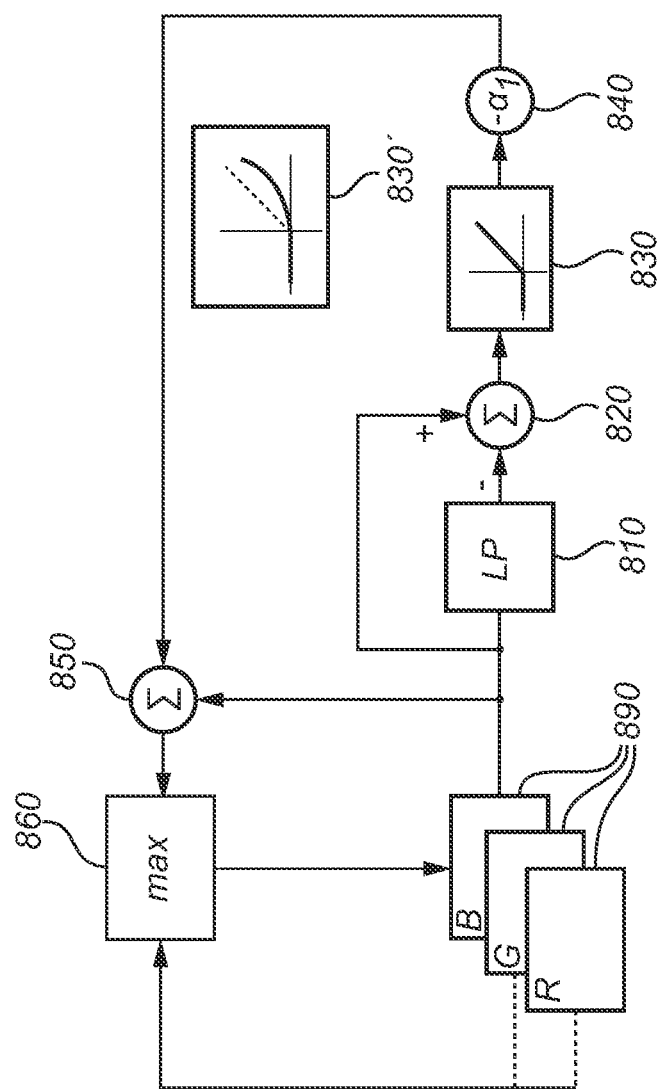
FIG. 8 is a schematic signal processing diagram illustrating some aspects of chromatic aberration suppression according to embodiments herein.

For a summary of the processing steps described so far, reference is made to the diagram in FIG. 8. Starting from a digital image with three color channels 890, one of the color channels (here: B) is fed to a low-pass filter 810, and a signed summation component 820 forms a difference, which is composed with a ramp function 830 (alternatively: a scaling function 830' with superlinear asymptotics at zero) and a scaling factor 840, whereby the overshoot component is obtained. The overshoot component is subtracted at position 850 from the original color channel, upon which a maximum operator 860 ensures that the resulting difference is nowhere less than a threshold computed from one or both of the two further color channels (here: G, R). The original color channel is replaced by its value after subtraction by the overshoot component or, in pixels where this is necessary, the threshold value. Save for components 830, 840 and 860, the processing diagram in FIG. 8 may be described as a type of unsharp masking applied to the B color channel.

In some embodiments, the subtraction 314 subject to the lower threshold is carried out by applying the rule (1) uniformly throughout the first color channel of the digital image.

In other embodiments, the rule (1) is applied only in some subareas of the digital image. In the remainder of the image, the overshoot component may not be subtracted at all, or it may be subtracted in an unrestricted way without regard to the lower threshold. The subareas may be those with the greatest likelihood of being affected by blue fringing. In one example, an edge filter may be used to localize sharp dark/bright edges and other image features where blue fringing is known to occur frequently, and the subareas may be defined as an environment thereof. In another example, saturated pixels and/or pixels with hues typical of blue fringes are localized, and the subareas are defined as an environment of these pixels. Alternatively, a trained machine-learning model may be utilized to find the dark/bright edges. Optionally, to avoid visible boundaries between the subareas where the substitution rule (1) is applied and a remainder of the image where it is not applied, one or more transition zones may be defined, where a modified rule is used:

$$B(u,v) \mapsto \max\{B(u,v) - \gamma_1 g(B(u,v) - B^{LP}(u,v)), T_B(u,v)\}. \quad (1')$$

The constant $\gamma_1$, suitably chosen in the interval (0,1), will have the effect of moderating the subtraction in such manner that the substituted pixel value is closer to the original pixel value B(u, v). A transition zone may be a neighborhood of each subarea with a predefined thickness $\epsilon > 0$.

Returning to FIG. 3, if there is no more color channel due to be processed by the negative correction 310 in the current round (N branch from step 318), the execution flow proceeds to the optional second block, positive correction 320. If the negative correction 310 can be said to address the blue fringes on the dark side of an edge in the image, the role of the positive correction 320 is to restore the 'missing' amount of blue on the bright side of the edge. An area with a deficit in blue color may have an artificially yellowish appearance.

To carry out the positive correction 320, an undershoot component is extracted 322 in an analogous manner as the overshoot component, though with opposite sign inside the g function:

$$g(B^{LP}(u,v) - B(u,v)).$$

The conditional subtraction operation 314 described above corresponds, in the positive correction 320, to a conditional addition 324 subject to an upper threshold. The upper threshold is dependent on a local value of at least one other color channel. The function $T_B$ according to any of the descriptions above may be used as upper threshold as well. This can be summarized as the following substitution rule:

$$B(u,v) \mapsto \min\{B(u,v) + g(B^{LP}(u,v) - B(u,v)), T_B(u,v)\}. \quad (3)$$

The positive correction 320 can be modified by inclusion of the same optional features (with a sign change, where necessary) as have been outlined in relation to the negative correction 310. This said, the specifics of the positive correction 320 (including the tuning and adaptation of numerical parameters, the choice of the function g, if any) remain independent of the negative correction 310 and need not resemble or match the negative correction 310.

The execution of the method 300 may end when there are no more color channels to which the positive correction 320 is to be applied (N branch from step 328). The digital image may then be processed by operations such as dynamic-range compression, tone mapping and sharpening if desired.

Figure 5:
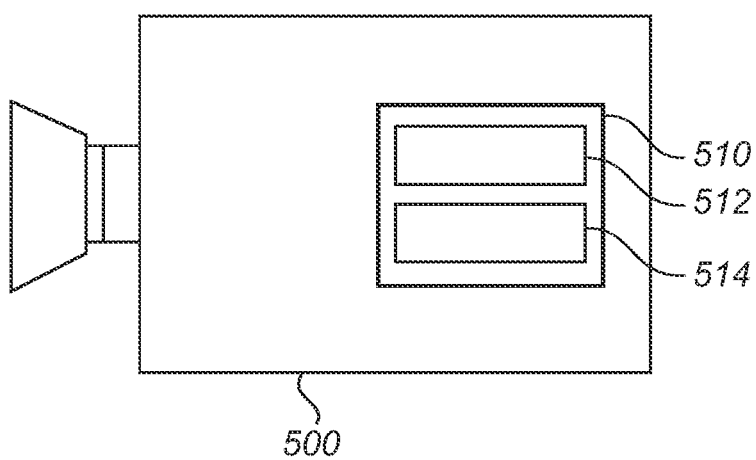
FIGS. 5, 6, and 7 show different ways in which an image processing device according to the present disclosure can be arranged in or at an imaging system.

An image processing device 510 with a memory 512 and suitably configured processing circuitry 514 may be used to carry out the method 300. As illustrated in FIG. 5, the image processing device 510 may be an integral part of a digital video camera 500. The video camera 500 may be one suitable for a monitoring use case. It may be for example be fixedly mounted and configured to deliver its outputs as a live stream.

Figure 6:
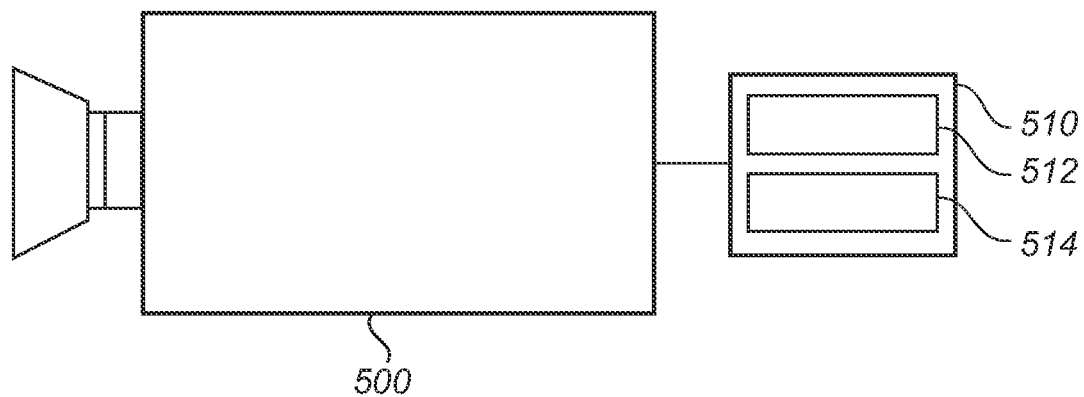

Alternatively, as shown in FIG. 6, the image processing device 510 may be configured to process outputs of a video camera 500. The image processing device 510 can be co-localized with the video camera 500 or may receive its outputs remotely over a communication network. The image processing device 510 preferably operates in real time, so that a user can inspect a video stream captured by the video camera 500 and processed by the image processing device 510 with a controlled (and typically small) delay.

Figure 7:
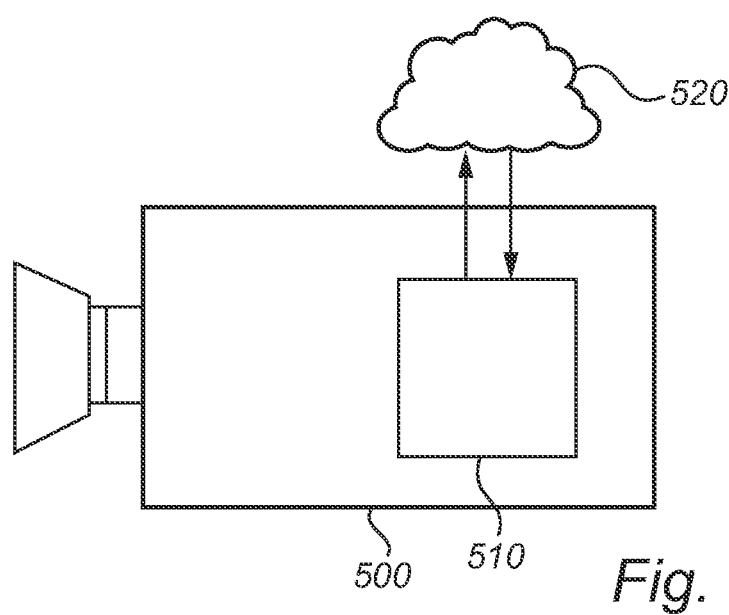

FIG. 7 shows a hybrid implementation, where the image processing device 510 is included in the video camera 500 and has the option of delegating some of its computational tasks to a networked (or cloud) processing resource 520.

The aspects of the present disclosure have mainly been described above with reference to a few embodiments. However, as is readily appreciated by a person skilled in the art, other embodiments than the ones disclosed above are equally possible within the scope of the disclosure, as defined by the appended patent claims.

The invention claimed is:

1. A method for suppressing chromatic aberration in a digital image with multiple color channels, the method performed by an image processing device containing a processor and a memory, the method comprising negatively correcting a first color channel by subtracting an overshoot component of the first color channel, wherein the subtraction is subject to a lower threshold, which is dependent on a local value of at least one further color channel, characterized in that the lower threshold value has a granularity of a group of multiple pixels.

2. The method of claim 1, wherein the lower threshold value is a local value of a second color channel.

3. The method of claim 1, wherein the lower threshold value is a combination of local values of a second and a third color channel.

4. The method of claim 1, wherein the subtraction has a granularity of one pixel.

5. The method of claim 1, wherein the first color channel represents a blue, bluish, red or reddish primary color.

6. The method of claim 1, wherein the lower threshold is enforced uniformly throughout the digital image.

7. The method of claim 1, wherein the lower threshold is enforced only in subareas of the digital image.

8. The method of claim 1, further comprising extracting the overshoot component by computing a difference between the first color channel of the digital image and a low-pass filtered copy of the same color channel.

9. The method of claim 8, wherein the extraction of the overshoot component further includes composing the difference with one or more of the following:
   a ramp function;
   a constant scaling factor;
   a scaling function with superlinear asymptotics at zero.

10. The method of claim 1, further comprising applying said negative correction to a second color channel.

11. The method of claim 1, further comprising positively correcting the first or a different one of the color channels by adding an undershoot component of the same color channel subject to an upper threshold, which is dependent on a local value of at least one other color channel.

12. The method of claim 1, wherein the negative correction and any positive correction are executed prior to any dynamic-range compression, tone mapping or sharpening of the digital image.

13. A non-transitory computer-readable storage medium having stored thereon instructions for implementing a method for suppressing chromatic aberration in a digital image with multiple color channel, when executed on a device having processing capabilities, the method comprising:
- negatively correcting a first color channel by subtracting an overshoot component of the first color channel, wherein the subtraction is subject to a lower threshold, which is dependent on a local value of at least one further color channel,
- characterized in that the lower threshold value has a granularity of a group of multiple pixels.

14. An image processing device for suppressing chromatic aberration in a digital image with multiple color channels, the image processing device comprising a memory and processing circuitry configured to perform a method for suppressing chromatic aberration in a digital image with multiple color channels, the method comprising:
- negatively correcting a first color channel by subtracting an overshoot component of the first color channel, wherein the subtraction is subject to a lower threshold, which is dependent on a local value of at least one further color channel,
- characterized in that the lower threshold value has a granularity of a group of multiple pixels.

* * * * *